US012286581B2

(12) United States Patent
Shin et al.

(10) Patent No.: US 12,286,581 B2
(45) Date of Patent: Apr. 29, 2025

(54) COLORED RADIATIVE COOLING DEVICE

(71) Applicant: KOREA ADVANCED INSTITUTE OF SCIENCE AND TECHNOLOGY, Daejeon (KR)

(72) Inventors: Jonghwa Shin, Daejeon (KR); Suwan Jeon, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 539 days.

(21) Appl. No.: 17/560,364

(22) Filed: Dec. 23, 2021

(65) Prior Publication Data

US 2022/0119696 A1   Apr. 21, 2022

Related U.S. Application Data

(63) Continuation of application No. PCT/KR2020/008170, filed on Jun. 23, 2020.

(30) Foreign Application Priority Data

Jun. 24, 2019  (KR) .................. 10-2019-0074948
Jun. 23, 2020  (KR) .................. 10-2020-0076408

(51) Int. Cl.
*C09K 5/14*         (2006.01)
(52) U.S. Cl.
CPC ..................... *C09K 5/14* (2013.01)
(58) Field of Classification Search
CPC .... C09K 5/14; F24F 5/00; F25B 23/00; F28F 13/18

USPC ......................................... 165/133
See application file for complete search history.

(56) References Cited

U.S. PATENT DOCUMENTS

2017/0342278 A1*  11/2017  Zalich ................. C09D 5/38
2018/0180331 A1    6/2018  Yu
2019/0152410 A1*   5/2019  Zhu .................... B32B 27/06
2019/0184687 A1    6/2019  Yasuda

FOREIGN PATENT DOCUMENTS

JP     2016188715 A    11/2016
KR    2019890000879     3/1989
WO    2017151514 A1     9/2017
WO    2018062011 A1     4/2018

OTHER PUBLICATIONS

International Search Report of PCT/KR2020/008170 dated Sep. 22, 2020.
Gil Ju Lee et al Colored, Daytime Radiative Coolers with Thin-Film Resonators for Aesthetic Purposes, Advanced Optical Materials, Weinheim, Germany: Wiley-VCH Aug. 27, 2018, vol. 6, No. 22, pp. 1-8.
Wei Li et al., Photonic Thermal Management of Coloured Objects, Nature Communications, Oct. 12, 2018.

* cited by examiner

*Primary Examiner* — Steve S Tanenbaum
(74) *Attorney, Agent, or Firm* — Shih IP Law Group, PLLC.

(57) ABSTRACT

The present disclosure relates to a colored radiative cooling device that includes a selective heat transfer layer between a spectral selective filter and a thermal emitter, and a method of cooling an object by using the colored radiative cooling device.

18 Claims, 10 Drawing Sheets

SSF-black

FIG. 3B(ii)

| 1 | ZnS (76 nm) |
| 2 | Ge (24 nm) |
| 3 | ZnS (128 nm) |
| 4 | Ge (116 nm) |
| 5 | ZnS (700 nm) |
|   | Ge substrate |
| 1 | ZnS (1060 nm) |

COLORED RADIATIVE COOLING DEVICE

CROSS-REFERENCE TO RELATED APPLICATIONS

This application is a continuation of PCT Application No. PCT/KR2020/008170, filed on Jun. 23, 2020, which claims priority to Korean Patent Application Number 10-2019-0074948, filed on Jun. 24, 2019, and 10-2020-0076408, filed on Jun. 23, 2020, all of which are hereby incorporated by reference in their entirety.

TECHNICAL FIELD

The present disclosure relates to a colored radiative cooling device including a selective heat transfer layer (SHTL) between a spectral selective filter (SSF) and a thermal emitter (TE), and a method of cooling an object by using the colored radiative cooling device.

BACKGROUND

A radiative cooling device is a device that can be cooler than the surrounding air even under sunlight without introduction of external energy. In real life in which the demand for energy has been increasing worldwide due to global warming, the presence of the radiative cooling device that is useful for cooling and insulating buildings or objects without energy consumption may have a great impact on the global energy industry.

Until now, research has been actively conducted only to improve cooling performance, and conventional radiative cooling devices can express only limited colors such as white paint or mirrors. Thus, it has been difficult to apply them to applications, such as vehicles and houses, where aesthetic factors are important. Therefore, recently, research is being conducted to develop a colored radiative cooling device, and the paper [Li, Wei, et al. "Photonic thermal management of coloured objects." Nature communications 9.1 (2018): 4240] discloses a multi-layer colored radiative cooling device that controls sunlight and mid-infrared light, but shows the cooling performance capable of reaching only the temperatures higher by 10° C. or more than the atmosphere. The main reason for this is that solar energy absorbed for color development is greater than radiative heat emission, which means that a conventional design method of a colored radiative cooling device cannot make it simultaneously possible to express a certain color and perform cooling to an ambient temperature or less. Also, even if it is possible to express a specific color and perform cooling to the ambient temperature or less, since a radiative cooling material of the conventional colored radiative cooling device is exposed to the outside, the temperature difference between the atmosphere and the radiative cooling device causes energy absorption by means of conduction and convection of the atmosphere. Therefore, as the radiative cooling efficiency increases, the heat absorption from the atmosphere increases. Here, since residual heat absorption by means of conduction and convention of the atmosphere is proportional to the strength of the wind, the cooling performance may become unstable depending on the weather.

Accordingly, in the present technical field, there has been a demand for a colored radiative cooling device capable of stably cooling to an ambient temperature or less while expressing a color.

DISCLOSURE OF THE INVENTION

Problems to be Solved by the Invention

The present disclosure relates to a colored radiative cooling device that includes a selective heat transfer layer (SHTL) between a spectral selective filter (SSF) and a thermal emitter (TE) and thus can simultaneously express a color and shows excellent radiative cooling performance.

However, the problems to be solved by the present disclosure are not limited to the above-described problems. Although not described herein, other problems to be solved by the present disclosure can be clearly understood by a person with ordinary skill in the art from the following descriptions.

Means for Solving the Problems

A first aspect of the present disclosure provides a colored radiative cooling device that includes a selective heat transfer layer (SHTL) between a spectral selective filter (SSF) and a thermal emitter (TE).

A second aspect of the present disclosure provides a method of cooling an object by using the colored radiative cooling device of the first aspect.

Effects of the Invention

A colored radiative cooling device according to the embodiments of the present disclosure is designed including a SHTL between a TE serving as a radiative cooling material and a SSF serving as a color expression material to thermally separate the TE and the SSF. Thus, the colored radiative cooling device can simultaneously express a vivid color and show excellent radiative cooling performance by independently controlling color expression and radiative cooling performance. Specifically, there is provided a colored radiative cooling device that can express all colors such as R, G, and B through the SSF and perform cooling to the temperatures lower by from 10° C. to 20° C. and theoretically 50° C. or more than an ambient temperature through the SHTL and the TE. Compared to a conventional radiative cooling device that performs cooling with a temperature difference of less than 10° C. from an ambient temperature but does not express a color, the colored radiative cooling device of the present disclosure is superior in both color expression and cooling performance.

The colored radiative cooling device according to the embodiments of the present disclosure independently controls the mid-infrared transmittance of the SSF, the mid-infrared transmittance and non-radiative insulation of the SHTL, and the mid-infrared absorptivity of the TE to maximize the cooling performance. Therefore, it is possible to design appropriate color expression and cooling performance for each application.

In the colored radiative cooling device according to the embodiments of the present disclosure, a non-radiative heat exchange with the external atmosphere functions to lower the temperature of the SSF that has been heated by absorption of sunlight, which suppresses heat transfer from the SSF to the TE and thus contributes to the improvement in cooling performance of the TE. Unlike the conventional radiative cooling device in which an emitter is directly exposed to the external atmosphere so that a non-radiative heat exchange between the emitter and the atmosphere degrades the cooling performance, the colored radiative cooling device according to the embodiments of the present disclosure can show excellent cooling performance even without components (window shield; PE sheet, aerogel, etc.) necessary for the improvement in cooling performance of the conventional radiative cooling device. Further, in the colored radiative cooling device according to the present disclosure, the TE is not directly exposed to the external atmosphere. Therefore, the colored radiative cooling device according to the present disclosure can express colors while stably cooling to an ambient temperature or less regardless of the weather.

The colored radiative cooling device according to the embodiments of the present disclosure can maintain the mid-infrared transmittance even if the height of the SHTL changes. Even when the non-radiative insulation is increased by increasing the height of the SHTL, the mid-infrared transmittance is not decreased, and, thus, the cooling performance of the TE is further improved. However, according to the conventional technology, an insulating layer (aerogel, porous medium) has a polymer placed in a radiative heat emission path, and as the height of the insulating layer increases, the insulating property is increased, but the mid-infrared transmittance is decreased. Therefore, the conventional technology is limited in that it cannot show sufficient cooling performance due to a tradeoff relationship between the non-radiative insulation and the mid-infrared transmittance.

The colored radiative cooling device according to the embodiments of the present disclosure can show a semi-permanent cooling performance even without using energy. Therefore, it can be complementary and alternative to all cooling systems that consume energy to lower the temperature of the refrigerant. Specifically, it can be applied to small devices, such as solar cells and LEDs, as well as commercial buildings, houses, ships, automobiles, roads, etc. to enable color expression and cooling performance at the same time and thus contribute to the improvement in aesthetic effect and energy consumption efficiency.

BRIEF DESCRIPTION OF THE DRAWINGS

FIG. 2A(i) shows a schematic diagram showing a structure of a SSF that expresses red color among RGB colors and FIG. 2A(ii) shows a graph showing performance for each wavelength according to an embodiment of the present disclosure.

FIG. 2B(i) shows a schematic diagram showing a structure of a SSF that expresses green color among RGB colors and FIG. 2B(ii) shows a graph showing performance for each wavelength according to an embodiment of the present disclosure.

FIG. 2C(i) shows a schematic diagram showing a structure of a SSF that expresses blue color among RGB colors and FIG. 2C(ii) shows a graph showing performance for each wavelength according to an embodiment of the present disclosure.

FIG. 3A(i) shows a sample of a SSF that expresses red color and FIG. 3A(ii) shows a schematic diagram showing a structure thereof according to an example of the present disclosure.

FIG. 3B(i) shows a sample of a SSF that expresses black color and FIG. 3B(ii) shows a schematic diagram showing a structure thereof according to an example of the present disclosure.

BEST MODE FOR CARRYING OUT THE INVENTION

Through the whole document, the term "connected to" may be used to designate a connection or coupling of one element to another element and includes both an element being "directly connected to" another element and an element being "electronically connected to" another element via another element.

Through the whole document, the term "on" that is used to designate a position of one element with respect to another element includes both a case that the one element is adjacent to the other element and a case that any other element exists between these two elements.

Further, through the whole document, the term "comprises or includes" and/or "comprising or including" used in the document means that one or more other components, steps, operation and/or the existence or addition of elements are not excluded from the described components, steps, operation and/or elements unless context dictates otherwise; and is not intended to preclude the possibility that one or more other features, numbers, steps, operations, components, parts, or combinations thereof may exist or may be added. The term "about or approximately" or "substantially" are intended to have meanings close to numerical values or ranges specified with an allowable error and intended to prevent accurate or absolute numerical values disclosed for understanding of the present disclosure from being illegally or unfairly used by any unconscionable third party.

Through the whole document, the term "step of" does not mean "step for."

Through the whole document, the term "combination(s) of" included in Markush type description means mixture or combination of one or more components, steps, operations and/or elements selected from a group consisting of components, steps, operation and/or elements described in Markush type and thereby means that the disclosure includes one or more components, steps, operations and/or elements selected from the Markush group.

Through the whole document, a phrase in the form "A and/or B" means "A or B, or A and B".

Throughout the whole document, the term "sunlight" refers to the electromagnetic radiation of the sun, including ultraviolet rays, visible rays, and near infrared rays (0.3 µm to 4 µm).

Throughout the whole document, the term "mid-IR (MIR) (first wavelength)" refers to an electromagnetic wave having a wavelength of 8 µm to 13 µm that the atmosphere cannot absorb among infrared rays that a blackbody radiates.

Throughout the whole document, the term "mid-IR (MIR) (second wavelength)" refers to an electromagnetic wave having a wavelength of 4 µm to 8 µm and a wavelength of 13 µm or more (up to 30 µm) that the atmosphere cannot absorb among infrared rays.

Hereinafter, embodiments and examples of the present disclosure will be described in detail with reference to the accompanying drawings. However, the present disclosure may not be limited to the following embodiments, examples, and drawings.

A first aspect of the present disclosure provides a colored radiative cooling device that includes a selective heat transfer layer (SHTL) between a spectral selective filter (SSF) and a thermal emitter (TE).

In an embodiment of the present disclosure, the SSF may express a color, the TE may perform radiative cooling, and the SHTL may block heat exchange.

In general, radiative cooling devices have to reflect 90% or more of incident sunlight for radiative cooling to an ambient temperature or less. Therefore, conventional radiative cooling devices are limited in that they can only express limited colors such as white color. However, the present disclosure relates to a colored radiative cooling device that has a thermal separation design and an optical complex design to maximize vivid color expression and cooling performance.

Specifically, a radiative cooling device is designed to maximize reflection or scattering to block sunlight, which is a primary heat source. On the other hand, for color expression, the radiative cooling device has to reflect only specific wavelengths within the visible light region (0.4 µm to 0.8 µm) while absorbing light in the other wavelengths. The solar absorption of radiative cooling device for remained light after wavelength-selective reflection is inevitable, otherwise transmitted light can reach to the internal object, which may heat the internal object when the internal object absorbs sunlight or reflect back the light toward the outside, which disturbs target color expression. Therefore, the conventional colored radiative cooling device is limited in that it cannot achieve color expression and cooling performance at the same time.

The colored radiative cooling device according to the present disclosure is designed to thermally separate the TE, which is a radiative cooling material, and the SSF, which is a color expression material, and blocks heat exchange by placing the SHTL between the two materials to stably express a color and show excellent cooling performance capable of reaching an ambient temperature or less. The SHTL blocks heat transfer from the SSF, which is in a high temperature state due to absorption of sunlight, to the TE, which is in a relatively low temperature state, thereby enabling color expression and cooling performance at the same time. Therefore, when an object in need of cooling is brought into contact with a part of the TE, the object can be cooled to a lower temperature than an ambient temperature without energy consumption. Further, according to the present disclosure, the SSF and the TE are designed to be separated. Therefore, the design of the colored radiative cooling device according to the present disclosure can be optimized to focus only on the unique function of each layer and thus can simultaneously achieve extreme cooling efficiency and express a certain color.

Figure 1A:
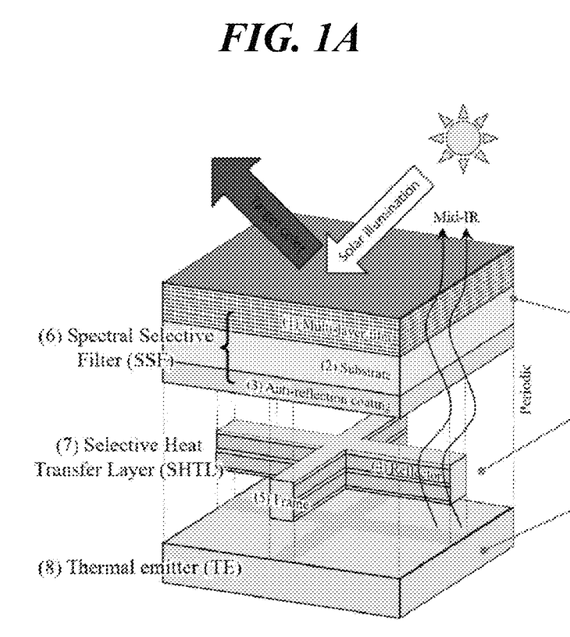
FIGS. 1A-1C are schematic diagrams showing a structure (FIG. 1A), a first type (Type 1 in FIG. 1B) and a second type (Type 2 in FIG. 1C) of performance required for each wavelength of a colored radiative cooling device according to an embodiment of the present disclosure.
Figure 1B:
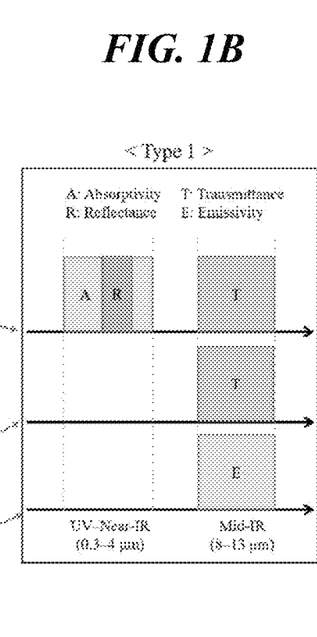
Figure 1C:
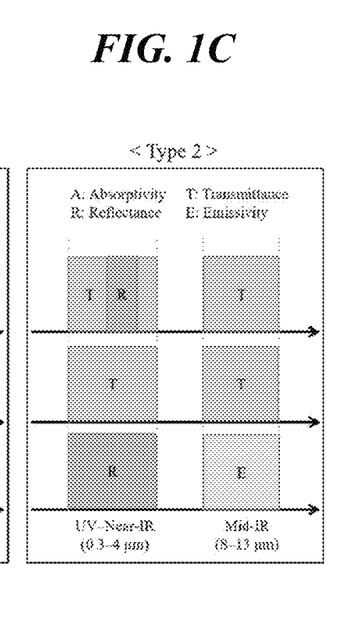

Referring to FIGS. 1A-1C, the colored radiative cooling device according to the present disclosure includes a SSF, a SHTL and a TE in order from top to bottom (FIG. 1A). Each layer requires different optical properties, a first type and a second type (Type 1 and Type 2 as shown in FIG. 1B and FIG. 1C, and to this end, the respective layers need to be designed with different materials and structures.

In an embodiment of the present disclosure, the SSF may be of a first type that reflects a first wavelength of a color to be expressed among incident sunlight, absorbs sunlight of wavelengths other than the first wavelength, and transmits mid-infrared light (hereinafter, referred to as "first type SSF"). Specifically, the first type SSF reflects a first wavelength of a color to be expressed among incident sunlight, absorbs sunlight of wavelengths other than the first wavelength, and transmits mid-infrared light of a first wavelength and reflects mid-infrared light of a second wavelength. More specifically, the first type SSF at the upper end of the colored radiative cooling device according to the present disclosure reflects a target wavelength of a color to be expressed among sunlight while absorbing sunlight of the other wavelengths and simultaneously allows radiative heat exchange between the SHTL and the TE by selectively transmitting light of wavelength in the mid-infrared light region toward the SHTL and the TE to implement radiative cooling performance.

In an embodiment of the present disclosure, the SSF may be of a second type that reflects or transmits a first wavelength of a color to be expressed among incident sunlight, absorbs sunlight of wavelengths other than the first wavelength, and transmits mid-infrared light. Specifically, the second type SSF reflects or transmits a first wavelength of a color to be expressed among incident sunlight, absorbs sunlight of wavelengths other than the first wavelength, and transmits mid-infrared light of a first wavelength and reflects mid-infrared light of a second wavelength (hereinafter, referred to as "second type SSF"). Specifically, the second type SSF at the upper end of the colored radiative cooling device according to the present disclosure reflects or transmits a target wavelength of a color to be expressed among sunlight while absorbing sunlight of the other wavelengths and simultaneously allows radiative heat exchange between the SHTL and the TE by selectively transmitting light of wavelength in the mid-infrared light region toward the SHTL and the TE to implement radiative cooling performance.

In an embodiment of the present disclosure, the SSF may be in the form of a multi-layer thin film, a nanopattern, or a polymer layer including dispersed nanoparticles, but is not limited thereto. The colored radiative cooling device of the present disclosure has a SSF and a TE designed to be separated, and, thus, the form can be freely changed to maximize optical properties. Therefore, the SSF may be in other forms without limitations to a multi-layer thin film, a nanopattern, or a polymer layer including dispersed nanoparticles.

In an embodiment of the present disclosure, the SSF may be in the form of a laminate of one or more compounds selected from the group consisting of zinc sulfide (ZnS), barium fluoride (BaF$_2$), zinc selenide (ZnSe), calcium fluoride (CaF$_2$), sodium chloride (NaCl), potassium bromide (KBr), potassium chloride (KCl), silver chloride (AgCl), silver bromide (AgBr), cesium iodide (CsI), rubidium chloride (RbCl), magnesium fluoride (MgF$_2$), diamond and thallium bromoiodide (TlBrI; KRS-5), but is not limited thereto.

In an embodiment of the present disclosure, a first substrate of the first type SSF may include germanium (Ge) or gallium arsenide (GaAs), but is not limited thereto. Specifically, the first type SSF may be in the form of a multi-layer thin film. In this case, the multi-layer thin film may have a structure in which one or more compounds selected from the group consisting of zinc sulfide (ZnS), barium fluoride (BaF$_2$), zinc selenide (ZnSe), calcium fluoride (CaF$_2$), sodium chloride (NaCl), potassium bromide (KBr), potassium chloride (KCl), silver chloride (AgCl), silver bromide (AgBr), cesium iodide (CsI), rubidium chloride (RbCl), magnesium fluoride (MgF$_2$), diamond and thallium bromoiodide (TlBrI; KRS-5) are laminated several times on the first substrate including germanium (Ge) or gallium arsenide (GaAs). In this case, the first substrate may absorb sunlight and transmit mid-infrared light.

In an embodiment of the present disclosure, a second substrate of the second type SSF may include one or more compounds selected from the group consisting of sodium chloride (NaCl), potassium bromide (KBr), potassium chloride (KCl), zinc sulfide (ZnS), silver chloride (AgCl), silver bromide (AgBr), cesium iodide (CsI) and diamond, but is not limited thereto. Specifically, the second type SSF may be in the form of a multi-layer thin film. In this case, the multi-layer thin film may have a structure in which one or more compounds selected from the group consisting of zinc sulfide (ZnS), barium fluoride (BaF$_2$), zinc selenide (ZnSe), calcium fluoride (CaF$_2$), sodium chloride (NaCl), potassium bromide (KBr), potassium chloride (KCl), silver chloride (AgCl), silver bromide (AgBr), cesium iodide (CsI), rubidium chloride (RbCl), magnesium fluoride (MgF$_2$), diamond and thallium bromoiodide (TlBrI; KRS-5) are laminated several times on the second substrate including one or more compounds selected from the group consisting of sodium chloride (NaCl), potassium bromide (KBr), potassium chloride (KCl), zinc sulfide (ZnS), silver chloride (AgCl), silver bromide (AgBr), cesium iodide (CsI) and diamond. In this case, the second substrate may transmit sunlight and mid-infrared light, and the compound(s) laminated on the second substrate may absorb all the sunlight of wavelengths other than the first wavelength of the color to be expressed among incident sunlight.

Figure 2A:
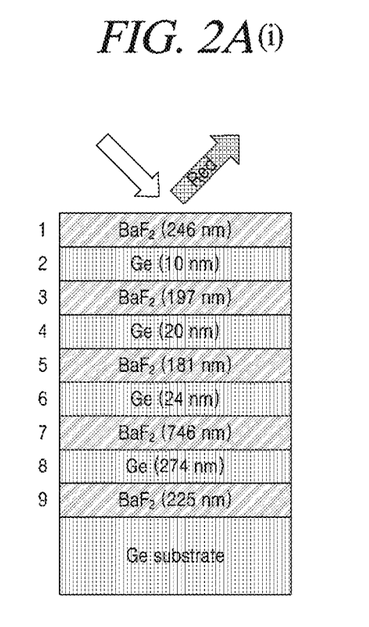
Figure 2B:
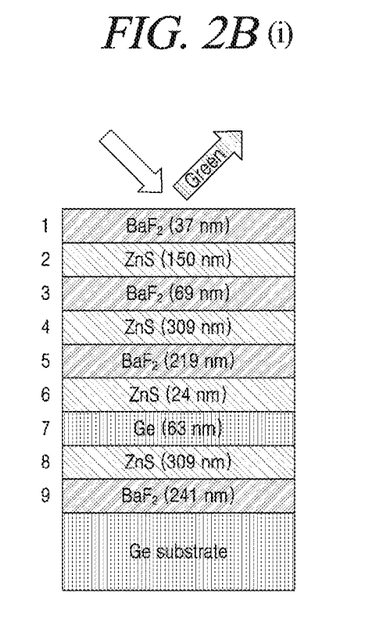
Figure 2C:
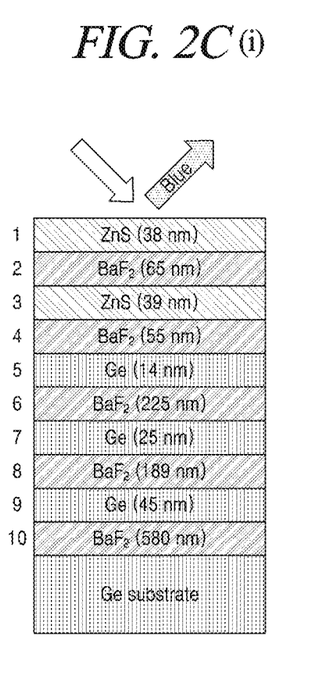

Referring to FIG. 2A(i), FIG. 2A(ii), FIG. 2B(i), FIG. 2B(ii), FIG. 2C(i) and FIG. 2C(ii), a first type SSF having a multi-layer thin film structure is implemented by using Ge and ZnS, BaF$_2$, which are transparent at wavelengths in the near-infrared light region to the mid-infrared light region, on a Ge substrate, which has high solar absorptivity and is transparent to mid-infrared light (shown in each of FIG. 2A(i), FIG. 2B(i) and FIG. 2C(i)). A thin film including ZnS or BaF$_2$ causes an interference effect of light to reflect sunlight of only a specific wavelength and transmit sunlight of the other wavelengths so as to be absorbed by Ge (shown in each of FIG. 2A(ii), FIG. 2B(ii) and FIG. 2C(ii)). It can be seen that the SSF expresses R, G and B colors and simultaneously absorbs sunlight of wavelengths other than the reflected wavelength and transmits mid-infrared light. By selecting the material constituting the multi-layer thin film, the number of thin films, the thickness and/or the periodic pattern of the thin films, it is possible to select a wavelength to be reflected from the SSF among sunlight. Also, it is possible to allow sunlight of wavelengths other than the selected wavelength to be absorbed by Ge and allow mid-infrared light to be transmitted and introduced to the SHTL and the TE. Further, the Ge acts as an anti-reflection layer at wavelengths in the mid-infrared light region while absorbing sunlight and thus can transmit 80% or more, 90% or more or 95% or more of mid-infrared light toward the SHTL without reflection.

In an embodiment of the present disclosure, the SHTL may transmit mid-infrared light and block heat transfer from the SSF to the TE. Specifically, since the first type SSF at the upper end reflects or absorbs all the wavelengths of sunlight, the SHTL is designed only to block heat transfer without considering sunlight. That is, the SHTL is designed to block heat exchange between the SSF having a relatively high temperature and the TE having a relatively low temperature by minimizing thermal conductivity and also designed not to absorb but to transmit all of mid-infrared light. Therefore, the SHTL transmits mid-infrared light radiated from the TE at the lower end as well as mid-infrared light introduced from the SSF at the upper end. Also, since sunlight of a color to be expressed by the second type SSF at the upper end is reflected or transmitted and all of the other sunlight is absorbed, the SHTL is designed to block heat transfer as well as to control sunlight. That is, the SHTL is designed to block heat exchange between the SSF having a relatively high temperature and the TE having a relatively low temperature by minimizing thermal conductivity and also designed not to absorb but to transmit all of mid-infrared light and sunlight. Therefore, the SHTL transmits mid-infrared light and sunlight radiated from the TE at the lower end as well as mid-infrared light and sunlight introduced from the SSF at the upper end.

In an embodiment of the present disclosure, the SHTL may include one or more selected from the group consisting of vacuum, air, a metal thin film, a polymer pattern and a polymer pillar, but is not limited thereto. The polymer may be one or more selected from the group consisting of poly(dimethylsiloxane) (PDMS), polyethylene (PE), polystyrene (PS) and polypropylene (PP).

Figure 6A:
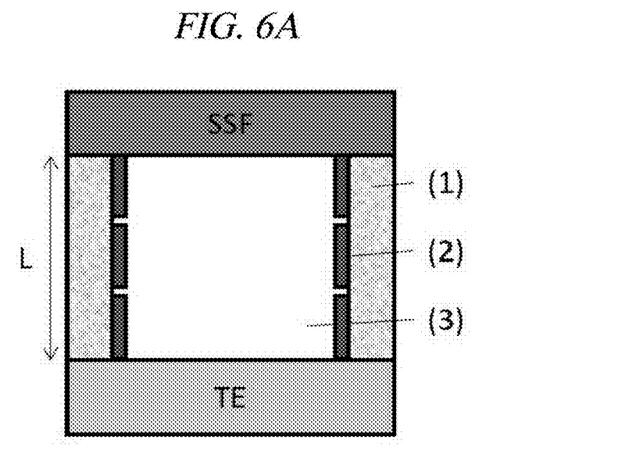
FIG. 6A is a schematic diagram showing a structure of a SHTL according to an example of the present disclosure.

Referring to FIG. 6A, the SHTL may be made of a material having low thermal conductivity (polymer, ceramic, etc.) as a component (1), a sunlight and mid-infrared light reflector (metal such as Al and Ag) as a component (2), and vacuum or air as a component (3). Specifically, any material transparent to mid-infrared light (including sunlight in case of using the second type SSF) is used without limitations as the component (1) of the SHTL, but a polymer or ceramic which is opaque and has low thermal conductivity can be used. If the component (1) of the SHTL is opaque, reflector structures as the component (2) are laminated intermittently to block light, which is transmitted through the component (3), not to be absorbed by the component (1) and minimize thermal conduction from the SSF to the TE. The component (1) includes a material that has low thermal conductivity and fully transmits mid-infrared light, and is patterned to have an excellent thermal insulating effect even with a small thickness (FIG. 6A).

In an embodiment of the present disclosure, the polymer pattern may be of a lattice type including a plurality of lattice units with a period, and a lattice width of the lattice unit may be 1/10 or less of the period, but is limited thereto.

In an embodiment of the present disclosure, the SHTL may have a thickness of 5 cm or less, but is not limited thereto.

Specifically, a space between the lattice type polymer patterns may be filled with vacuum or air, and the vacuum or air has a lower thermal conductivity than the polymer.

Thus, as the area of the polymer pattern in contact with the SSF is decreased and the area of the vacuum or air is increased, the effective thermal conductivity is lowered. Therefore, a more effective SHTL can be implemented. However, if the area of the vacuum or air is excessively increased and the area of the polymer pattern is decreased, stability including mechanical strength may be degraded. Therefore, it is desirable that the lattice width of the lattice unit be 1/10 or less of the period. Also, since the lattice type polymer pattern has a lattice shape, convection can be suppressed when there is air inside the lattice. Therefore, cooling performance can be maximized.

In an embodiment of the present disclosure, the SHTL includes air and a polymer pattern, and an area ratio of the air and the polymer pattern and a thickness of the SHTL may be determined depending on an allowable surface power density for desired cooling. Specifically, the area ratio of the vacuum or air and the polymer (the lattice width of the lattice unit) and the thickness of the SHTL may be determined depending on a required cooling performance, i.e., an allowable surface power density. More specifically, when the allowable surface power density is $P(W/m^2)$, the thermal conductivity of the polymer is $k(W/m·K)$, and the thermal conductivity of air is $k_0(W/m·K)$, the area ratio of the air and the polymer is A:1−A and the temperature difference between the SSF and the TE is dT=T(SSF)−T(TE), the thickness d(m) of the SHTL can be determined by the following Equation 1. Therefore, the area ratio of the vacuum or air and the polymer (the lattice width of the lattice unit) and the thickness of the SHTL can be determined depending on the allowable surface power density.

$$d = dT \cdot (A \cdot k_0 + (1-A) \cdot k)/P \quad \text{[Equation 1]}$$

Referring to FIG. 1A, a SHTL formed into a lattice type polymer pattern having a mesh structure was designed in consideration of the convenience of the process and the stability of the structure. When the thermal conductivity of the polymer is 0.3 W/m·K, if a width w of a polymer rod is designed to be 1/10 of a period p, it may be weighted-averaged with the thermal conductivity of air (0.026 W/m·K). As a result, an effective thermal conductivity of 0.078 W/m·K can be obtained. Accordingly, the same thermal insulation effect can be exhibited even with a thickness 4 times smaller than that of a general polymer layer. Also, when a thickness t of the SHTL is 5 cm, the energy density transferred from the atmosphere to the TE having a temperature 10° C. lower than the atmosphere is 70 W/m^2. Therefore, considering that the residual heat energy density absorbed by the TE of the conventional colored radiative cooling device is several tens to hundreds of W/m^2, the present disclosure can show cooling performance equivalent or superior to the conventional technology even if the SHTL is designed to be 5 cm or less. Further, the mid-infrared light transmittance of the SHTL is inversely proportional to the area of the polymer pattern with respect to the portion in contact with the SSF, and the SHTL of the present disclosure can transmit most of the mid-infrared light through vacuum or air and can have a mid-infrared light transmittance of 80% or more, 90% or more, or 95% or more.

Figure 6B:
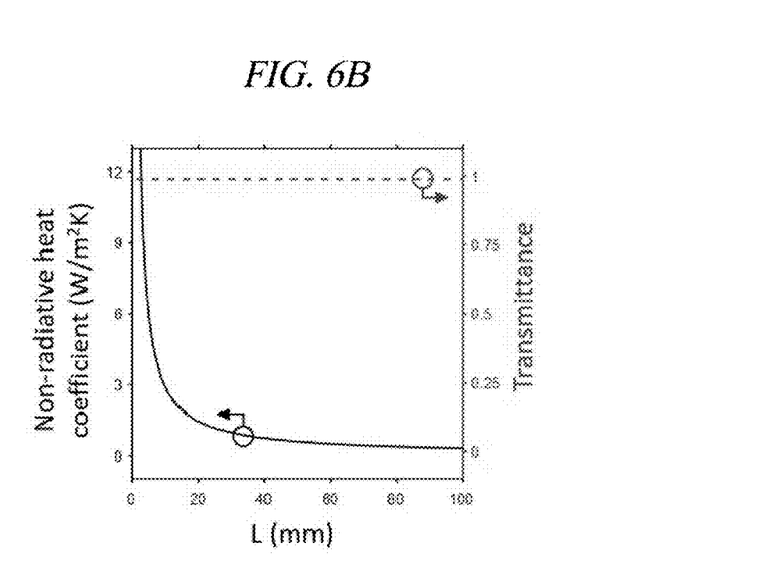
FIG. 6B is a graph showing the non-radiative heat coefficient and transmittance depending on the depth of the SHTL according to an example of the present disclosure.
Figure 6C:
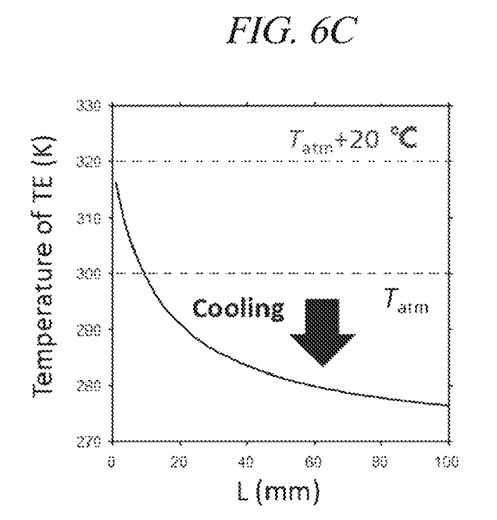
FIG. 6C is a graph showing the cooling performance depending on the depth of the SHTL according to an example of the present disclosure.
Figure 7A:
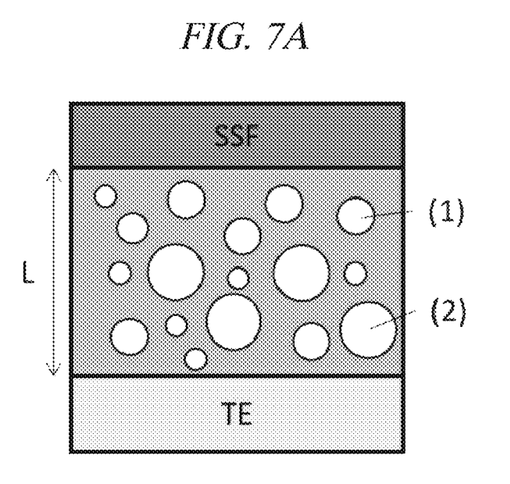
FIG. 7A is a schematic diagram showing a structure in which a conventional porous material is substituted for a SHTL according to a comparative example of the present disclosure.
Figure 7B:
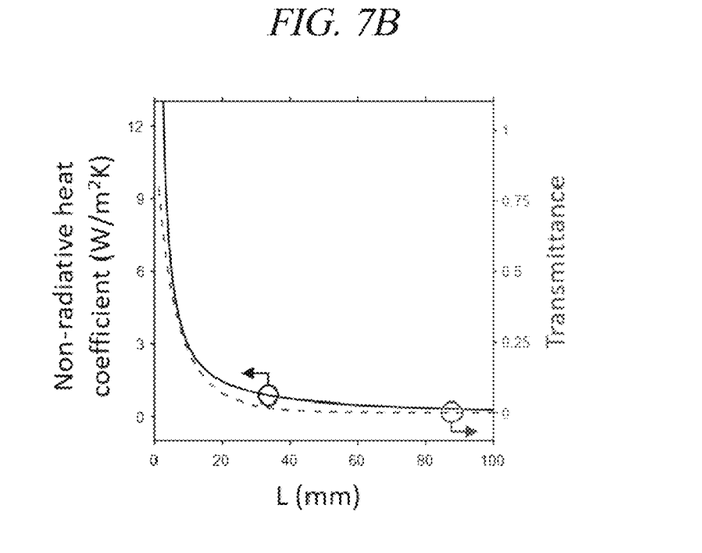
FIG. 7B is a graph showing the non-radiative heat coefficient and transmittance depending on the depth of the porous material layer according to a comparative example of the present disclosure.
Figure 7C:
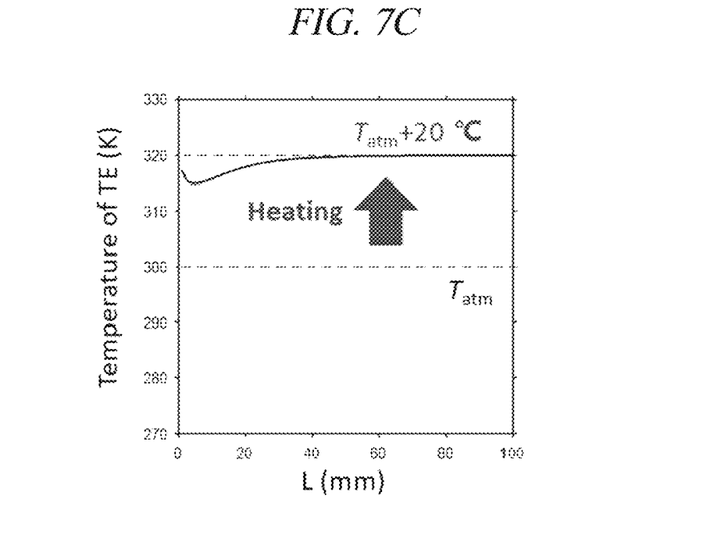
FIG. 7C is a graph showing the cooling performance depending on the depth of the porous material layer according to a comparative example of the present disclosure.

The SHTL has a pattern including a reflector (components (1), (2) and (3) in FIG. 6A) and can improve a thermal insulating function while maintaining a mid-infrared light transmitting function. Therefore, as the height of the SHTL is increased, the non-radiative heat conduction coefficient is decreased, but the mid-infrared light transmitting function is maintained (FIG. 6B). Therefore, the cooling performance of the TE is also improved (FIG. 6C). Although a porous insulating layer according to the conventional technology includes an insulating material and pores (FIG. 7A), the mid-infrared light transmitting function and the thermal insulating function have a tradeoff relationship. Therefore, as the height of the insulating layer is increased, the thermal insulating function is improved, but the mid-infrared light transmitting function is sharply decreased (FIG. 7B). Therefore, the cooling performance of the TE is degraded and cooling to the room temperature or less cannot be achieved (FIG. 7C). That is, as for the SHTL of the present disclosure, the mid-infrared light transmitting function and the thermal insulating function do not have a tradeoff relationship, and, thus, it is possible to express a target color from the SSF and secure the cooling performance of the TE.

In an embodiment of the present disclosure, the TE may absorb mid-infrared light introduced from the SHTL and radiate it to the outside. Specifically, the TE is designed to absorb all of the mid-infrared light without reflection at mid-infrared wavelengths and radiate the mid-infrared light to the outside through the SHTL and the SSF, and induces maximization of blackbody radiation. Thus, the TE functions to cool the TE and the internal object to an ambient temperature or less. Further, when the colored radiative cooling device of the present disclosure uses the second type SSF, sunlight introduced into the TE needs to be considered. In this case, the TE does not absorb incoming sunlight but transmits all of it and allows it to be reflected to the outside through a lower mirror.

In an embodiment of the present disclosure, the TE may be in the form of a polymer layer, a multi-layer thin film, a nanopattern, or a polymer layer including dispersed nanoparticles, but is not limited thereto.

In an embodiment of the present disclosure, the polymer in the TE may be one or more selected from the group consisting of poly(dimethylsiloxane) (PDMS), polyethylene (PE), polystyrene (PS) and polypropylene (PP), but is not limited thereto. Specifically, the polymer layer may have a thickness of from 100 µm to 1000 µm, but is not limited thereto. More specifically, the polymer layer may have a thickness of from 100 µm to 1000 µm, from 200 µm to 1000 µm, from 300 µm to 1000 µm, from 400 µm to 1000 µm, from 500 µm to 1000 µm, from 100 µm to 900 µm, from 100 µm to 800 µm, from 400 µm to 900 µm or from 300 µm to 800 µm.

Referring to FIG. 1A, in consideration of consistency in manufacturing and convenience in process, the TE was designed using a polymer having the same component as the SHTL. The TE needs to be designed to maximize the absorptivity of mid-infrared light, and when PDMS is used, the TE even with a thickness of 500 µm or more absorbs most of the mid-infrared light. Thus, the TE can be easily manufactured without employing a conventional vacuum-based process. Therefore, when the TE of the present disclosure is placed toward an object to be cooled, the object can be cooled to an external ambient temperature or less through thermal conduction and convection.

In the colored radiative cooling device according to an embodiment of the present disclosure, the TE may further include a mirror including silver (Ag) or aluminum (Al) on the other side of the SHTL. Specifically, if the SSF is of the second type, sunlight and mid-infrared light introduced from the SSF are transmitted through the SHTL and then introduced into the TE. In this case, mid-infrared light is absorbed by the TE and then radiated back to the SHTL, whereas sunlight is not absorbed nor radiated by the TE. Accordingly, in order to implement a cooling function, a mirror including silver (Ag) or aluminum (Al) and configured to reflect (transmit) the introduced sunlight back to the outside may be further included at a lower end of the TE. Further, since the sunlight has a wavelength that is not absorbed by the SSF, the colored radiative cooling device may express colors when the sunlight is reflected to the outside.

The colored radiative cooling device according to an embodiment of the present disclosure may further include an anti-reflection layer between the SSF and the SHTL. Specifically, if the SSF is of the first type, the anti-reflection layer may transmit mid-infrared light having the first wavelength and radiated from the TE to the SSF without reflection. Further, if the SSF is of the second type, the anti-reflection layer allows the mid-infrared light having the first wavelength and radiated from the TE to be transmitted to the SSF without reflection and the sunlight reflected from the mirror to be transmitted to the SSF without absorption and reflection.

In an embodiment of the present disclosure, the antireflection layer may be in the form of a multi-layer thin film, a nanopattern, or a polymer layer including dispersed nanoparticles, but is not limited thereto.

In an embodiment of the present disclosure, the anti-reflection layer is in the form of a laminate of one or more compounds selected from the group consisting of zinc sulfide (ZnS), barium fluoride ($BaF_2$), zinc selenide (ZnSe), calcium fluoride ($CaF_2$), sodium chloride (NaCl), potassium bromide (KBr), potassium chloride (KCl), silver chloride (AgCl), silver bromide (AgBr), cesium iodide (CsI), rubidium chloride (RbCl), magnesium fluoride ($MgF_2$), diamond and thallium bromoiodide (TlBrI; KRS-5) on the substrate of the SSF, and the number of laminates of the anti-reflection layer may be smaller than that of the SSF, but is not limited thereto. Specifically, if the first type SSF is used, the anti-reflection layer may be designed in the same structure as the SSF and may have a smaller number of layers than the SSF because it is not necessary to consider a sunlight wavelength region. It can be implemented with the number of layers. If the second type SSF is used, the anti-reflection layer is designed not to absorb nor reflect sunlight unlike the second type SSF. The anti-reflection layer is in the form of a laminate of the above-described compounds on the substrate shared with the SSF. Thus, a multi-layer thin film that simultaneously expresses colors and performs anti-reflection of mid-infrared light is formed on one side of the substrate, and a multi-layer thin film that performs anti-reflection of mid-infrared light without color expression is formed on the other side of the substrate.

Figure 3A:
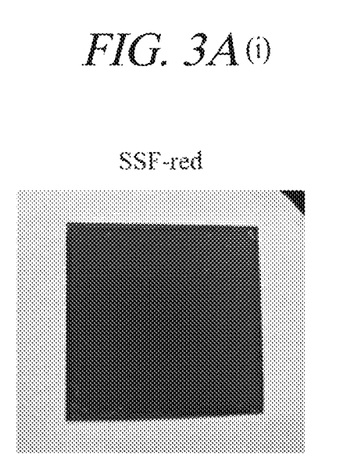
Figure 3B:
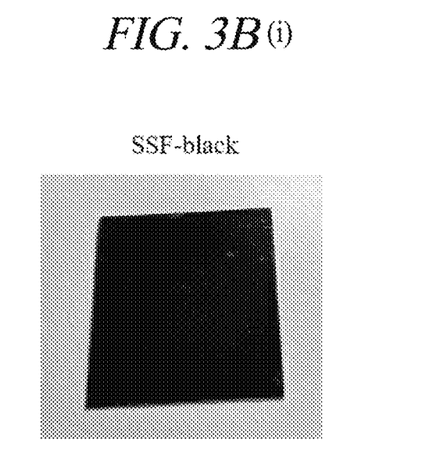
Figure 4:
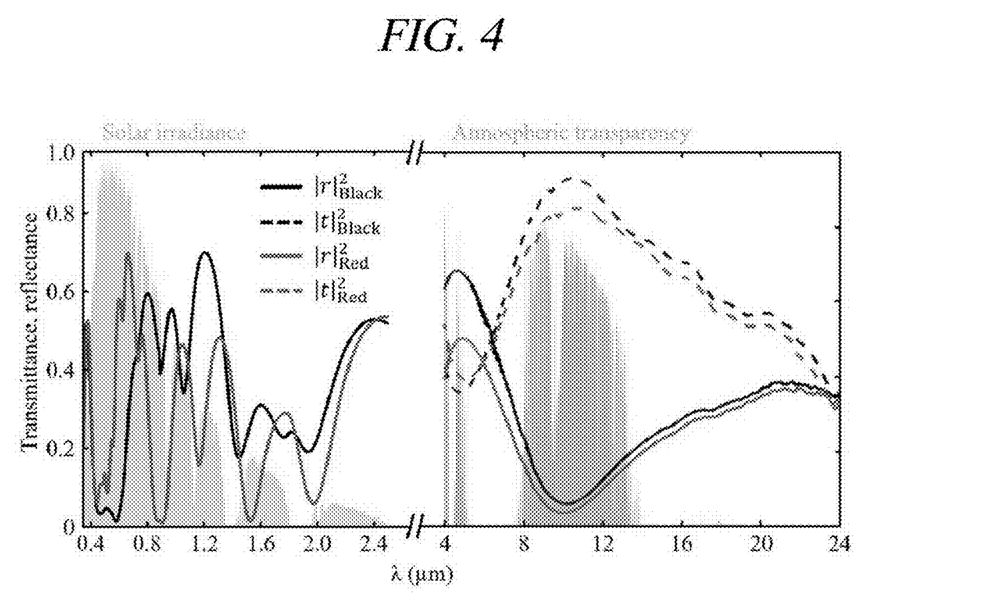
FIG. 4 is a graph showing the transmittance and reflectance of a SSF from the visible light region to the mid-infrared light region according to an example of the present disclosure.

Hereinafter, description will be made with reference to FIG. 3A(i), FIG. 3A(ii), FIG. 3B(i), FIG. 3B(ii) and FIG. 4.

The colored radiative cooling device according to an embodiment of the present disclosure may include a SSF including five layers on one side of a Ge substrate and an antireflection layer including one layer on the other side of the Ge substrate. The colored radiative cooling device of the above embodiment includes the SSF including five layers on one side of the Ge substrate and thus can express red color and black (FIG. 3A(i), FIG. 3A(ii), FIG. 3B(i) and FIG. 3B(ii)).

The colored radiative cooling device according to an embodiment of the present disclosure exhibits a high reflectance in a wavelength range of red (or black), which is a color to be expressed in the visible light region, and a low reflectance in the other visible light region. Thus, it can be seen that the colored radiative cooling device according to an embodiment of the present disclosure expresses red (or black) (FIG. 4).

It can be seen that the colored radiative cooling device according to an embodiment of the present disclosure exhibits a high transmittance and a low reflectance in the mid-infrared wavelength range. In particular, it can be seen that the colored radiative cooling device according to an embodiment of the present disclosure exhibits a very high transmittance and a low reflectance in a first mid-infrared wavelength range (wavelengths of from 8 μm to 13 μm), but exhibits a relatively low transmittance and a high reflectance in a second mid-infrared wavelength range (wavelengths of 4 μm or more except the first wavelength region) (FIG. 4). Therefore, it can be seen that the colored radiative cooling device according to an embodiment of the present disclosure simultaneously expresses a vivid color and shows excellent radiative cooling performance.

A second aspect of the present disclosure provides a method of cooling an object by using the colored radiative cooling device of the first aspect.

In an embodiment of the present disclosure, the method of cooling an object may include locating the radiative cooling device on an object to be cooled.

Descriptions of the parts common to the first aspect and the second aspect may be applied to both the first aspect and the second aspect, even though they are omitted hereinafter.

Figure 5:
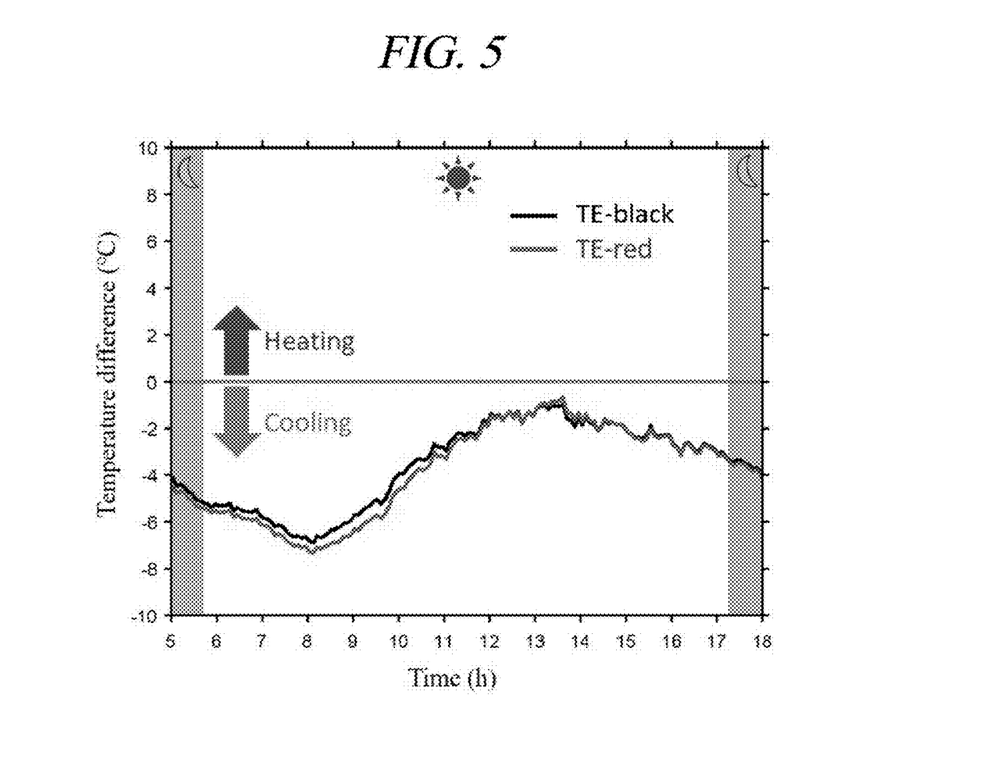
FIG. 5 is a graph showing cooling onset temperatures of a TE compared to ambient temperatures during a day according to an example of the present disclosure.

Referring to FIG. 5, it can be seen that an object can be cooled using the colored radiative cooling device of the present disclosure. Specifically, radiative cooling performance of the colored radiative cooling device according to an embodiment of the present disclosure was measured and compared to that of a colored radiative cooling device according to a comparative example. The measurement was conducted in Daejeon on Oct. 8, 2020, and a cooling onset temperature of each radiative cooling device compared to an ambient temperature was measured during a day. As a result of the measurement, it was confirmed that the colored radiative cooling device according to an embodiment can perform cooling to the room temperature or less during the daytime. Accordingly, it was confirmed that the colored radiative cooling device according to an embodiment of the present disclosure can exhibit a vivid color and show excellent radiative cooling performance.

We claim:

1. A colored radiative cooling device, comprising a selective heat transfer layer between a spectral selective filter and a thermal emitter, the spectral selective filter being outside of the thermal emitter,
    wherein the spectral selective filter is of a first type that reflects a first wavelength of a color to be expressed among incident sunlight, and
    wherein the spectral selective filter absorbs sunlight of wavelengths other than the first wavelength, and transmits mid-infrared light.

2. The colored radiative cooling device of claim 1,
    wherein the spectral selective filter expresses a color, the thermal emitter performs radiative cooling, and the selective heat transfer layer blocks heat exchange.

3. The colored radiative cooling device of claim 1,
    wherein the selective heat transfer layer transmits mid-infrared light and blocks heat transfer from the spectral selective filter to the thermal emitter.

4. The colored radiative cooling device of claim 1,
    wherein the thermal emitter absorbs mid-infrared light introduced from the selective heat transfer layer and radiates it to the outside.

5. The colored radiative cooling device of claim 1,
    further comprising a mirror including silver (Ag) or aluminum (Al) at a lower end of the thermal emitter.

6. The colored radiative cooling device of claim 1,
wherein the spectral selective filter is in the form of a multi-layer thin film, a nanopattern, or a polymer layer including dispersed nanoparticles.

7. The colored radiative cooling device of claim 1,
wherein the spectral selective filter is in the form of a laminate of one or more compounds selected from the group consisting of zinc sulfide (ZnS), barium fluoride (BaF$_2$), zinc selenide (ZnSe), calcium fluoride (CaF$_2$), sodium chloride (NaCl), potassium bromide (KBr), potassium chloride (KCl), silver chloride (AgCl), silver bromide (AgBr), cesium iodide (CsI), rubidium chloride (RbCl), magnesium fluoride (MgF$_2$), diamond, and thallium bromoiodide (TlBrI; KRS-5) on a first substrate, and
wherein the first substrate includes germanium (Ge) or gallium arsenide (GaAs).

8. The colored radiative cooling device of claim 1,
wherein the selective heat transfer layer includes air and a polymer pattern, and
an area ratio of the air and the polymer pattern and a thickness of the selective heat transfer layer are determined depending on an allowable surface power density for desired cooling.

9. The colored radiative cooling device of claim 1,
wherein the selective heat transfer layer has a thickness of 5 cm or less.

10. The colored radiative cooling device of claim 1,
wherein the spectral selective filter is of a second type that reflects or transmits a first wavelength of a color to be expressed among incident sunlight, absorbs sunlight of wavelengths other than the first wavelength, and transmits mid-infrared light.

11. The colored radiative cooling device of claim 10,
wherein the spectral selective filter is in the form of a laminate of one or more compounds selected from the group consisting of zinc sulfide (ZnS), barium fluoride (BaF$_2$), zinc selenide (ZnSe), calcium fluoride (CaF$_2$), sodium chloride (NaCl), potassium bromide (KBr), potassium chloride (KCl), silver chloride (AgCl), silver bromide (AgBr), cesium iodide (CsI), rubidium chloride (RbCl), magnesium fluoride (MgF$_2$), diamond, and thallium bromoiodide (TlBrI; KRS-5) on a second substrate, and
wherein the second substrate includes one or more compounds selected from the group consisting of sodium chloride (NaCl), potassium bromide (KBr), potassium chloride (KCl), zinc sulfide (ZnS), silver chloride (AgCl), silver bromide (AgBr), cesium iodide (CsI) and diamond.

12. The colored radiative cooling device of claim 1,
wherein the selective heat transfer layer includes one or more selected from the group consisting of vacuum, air, a metal thin film, a polymer pattern, and a polymer pillar.

13. The colored radiative cooling device of claim 12,
wherein the polymer pattern is of a lattice type including a plurality of lattice units with a period, and
a lattice width of the lattice unit is 1/10 or less of the period.

14. The colored radiative cooling device of claim 1,
further comprising:
an anti-reflection layer between the spectral selective filter and the selective heat transfer layer.

15. The colored radiative cooling device of claim 14,
wherein the anti-reflection layer is in the form of a laminate of one or more compounds selected from the group consisting of zinc sulfide (ZnS), barium fluoride (BaF$_2$), zinc selenide (ZnSe), calcium fluoride (CaF$_2$), sodium chloride (NaCl), potassium bromide (KBr), potassium chloride (KCl), silver chloride (AgCl), silver bromide (AgBr), cesium iodide (CsI), rubidium chloride (RbCl), magnesium fluoride (MgF$_2$), diamond, and thallium bromoiodide (TlBrI; KRS-5) on a substrate of the spectral selective filter.

16. The colored radiative cooling device of claim 1,
wherein the thermal emitter is in the form of a polymer layer, a multi-layer thin film, a nanopattern, or a polymer layer including dispersed nanoparticles.

17. The colored radiative cooling device of claim 16,
wherein the polymer includes one or more selected from the group consisting of poly(dimethylsiloxane) (PDMS), polyethylene (PE), polystyrene (PS), and polypropylene (PP).

18. The colored radiative cooling device of claim 16,
wherein the polymer layer has a thickness of from 100 μm to 1000 μm.

* * * * *